May 26, 1936.   G. A. FOISY   2,042,174
TESTING APPARATUS
Filed Sept. 2, 1932
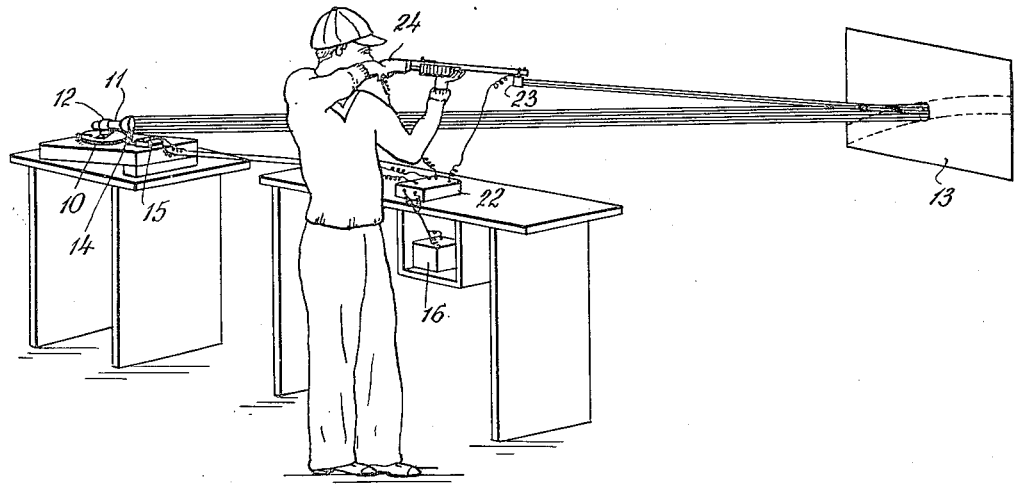
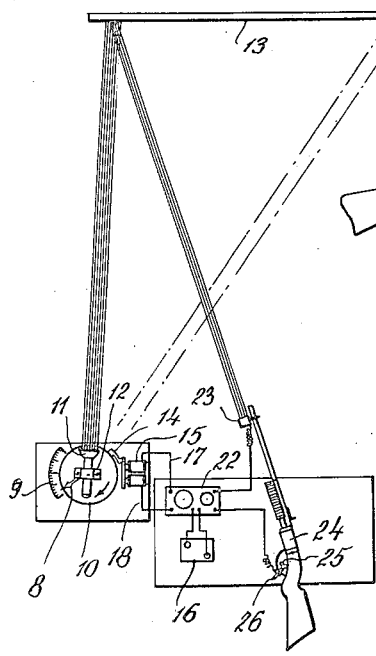
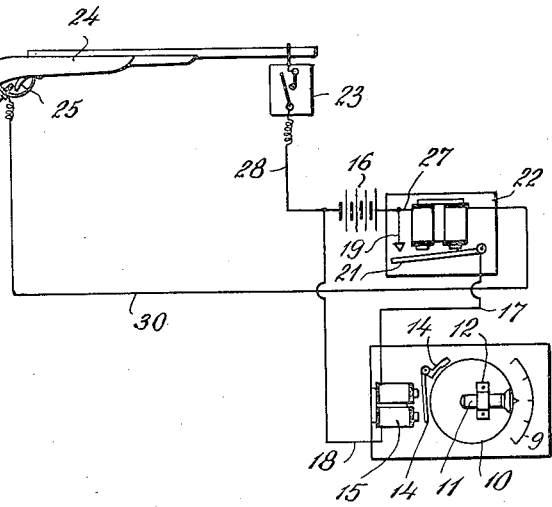
INVENTOR
GEORGE A FOISY
BY
Penrie, Davis, Marvin & Edmonds
ATTORNEYS

UNITED STATES PATENT OFFICE 2,042,174

TESTING APPARATUS

George A. Foisy, New Haven, Conn., assignor to Winchester Repeating Arms Company, New Haven, Conn., a corporation of Maryland Application September 2, 1932, Serial No. 631,464

5 Claims. (Cl. 35—25)

This invention relates to the testing of human reactions and has for an object the provision of novel testing apparatus which may be employed for scientific or educational purposes or for commercial purposes, as, for example, in the amusement field or in the advertising field.

The apparatus of the invention is designed to test the coordination of the eye and muscles and to measure the speed or rapidity of response and control of a subject.

The apparatus of the invention comprises a light source, a recording device, a light-sensitive cell responsive to light from the light source, a source of electric current and electrical conductors so arranged that operation of the recording device is controlled through the action of light from the light source on the light-sensitive cell. The light source and the light-sensitive cell are movable relatively to one another; either may be fixed or both may be movable. The arrangement of the light source may be such that a beam of direct light or a beam of reflected light is obtained. The source of the beam of light or the light-sensitive cell is so mounted that a subject to be tested must direct the beam of light on the light-sensitive cell. The recording apparatus may be of any suitable type and the end of the recording period may be indicated in any suitable manner. Thus, for example, the recording device may be of the type whose operation could be stopped completely to indicate the end of the recording period, or the recording device may be of the continuously operating type in which the end of the recording period is indicated by a mark made by a controllable element of the device.

The invention will be better understood from a consideration of the following description in conjunction with the accompanying drawing in which Fig. 1 is a perspective view of a complete apparatus of the invention illustrating its method of use;

Fig. 2 is a plan view of the apparatus shown in Fig. 1; and

Fig. 3 is a diagrammatic view of the electric circuit arrangements for the apparatus illustrated in Figs. 1 and 2.

The apparatus shown in Figs. 1 to 3 of the drawing comprises a turn table 10 provided with suitable operating mechanism (not shown) and having a flashlight 11 attached thereto by means of a strap 12. The turn table 10 and the flashlight 11 are so arranged that a spot of light from a light beam from the flashlight will travel across a vertical screen 13 when the turn table is rotated.

The operating mechanism for the turn table may be of the friction drive type commonly employed in phonographs. The screen may be of any suitable material capable of reflecting a beam of light.

Rotation of the turn table is controlled by a stopping or braking mechanism comprising a pivoted contact element 14 and an electromagnet 15. The contact element is so mounted that one end portion moves into engagement with the electromagnet 15 and the other end portion moves into engagement with the peripheral surface of the turn table and locks the turn table against movement when the electromagnet 15 is energized.

The electromagnet 15 is electrically connected with a source of supply of electric current 16 (Fig. 3) through suitable conductors 17, 18, and 20 and the movable element 21 of a photoelectric relay 22. The movable element 21 is so mounted as to engage a contact element 19 connected to the conductor 27 to complete the circuit including the electromagnet 15.

The photoelectric relay 22 is included in a circuit which also includes the source of supply of electric current 16, and a photoelectric cell 23 mounted on and grounded to the barrel of a gun 24 provided with a control switch of which the movable element is the trigger 25 of the gun 24. A screw 26 mounted on the trigger guard with an end in the path of travel of the trigger forms the stationary contact of the control switch. The screw 26 and the trigger guard should be suitably insulated from the gun barrel and trigger. The photoelectric relay is electrically connected to the source of current and the photoelectric cell by means of conductors 27 and 28 and to the control switch by means of the conductor 30.

In the use of apparatus of the type shown in Figs. 1 to 3, the subject to be tested takes control of the gun 24 in position to aim it at a moving target. The brake 14 may then be released to permit the turn table to rotate. During the course of the rotation of the turn table, the beam from the flashlight strikes the screen forming a light spot which travels across the screen and from which a beam of light is reflected in the direction of the subject. When the beam from the flashlight strikes the screen, the subject raises the gun to a firing position and, while the spot of light formed by the beam passes across the screen, endeavors to draw a bead on the spot and thus direct the reflected light from the spot to the photoelectric cell. When the subject has drawn a bead on the spot, the trigger is pulled into contact with the stationary element 26 of the control switch. The circuit including the photoelectric relay 22 is thus closed and the movable element 21 of the photoelectric relay moves into contact with the contact element 19 attached to the conductor 27 completing the circuit including the electromagnet 15 of the turn table stopping mechanism. An end of the brake element 14 is drawn into contact with the electromagnet 15, and its opposite end is forced into engagement with the peripheral surface of the turn table and locks the turn table against further movement to end the recording period.

When rotation of the turn table is stopped, the light spot remains fixed on the screen in the position it occupied when the subject pulled the trigger. The distance of the stationary light spot from the edge of the screen is a measure of the subject's speed of reaction or coordination. The speed of reaction of the subject may also be measured by means of suitably calibrated scales on the turn table mechanism. Thus, a stationary portion of the turn table mechanism may be provided with a scale 9 on which a pointer 8 mounted on the turn table indicates zero at the instant the light beam strikes the screen, and the scale may be so calibrated that when the turn table stops the pointer will indicate a figure thereon to represent the elapsed time in seconds or any other suitable units of measurement.

The arrangement of the turn table and flashlight may be such that the light spot traverses a horizontal path or the arrangement may be such that a curved path may be traversed. The light spot may be caused to follow a curved path of travel, for example, by raising an edge portion of and thus tilting the turn table mechanism as shown in Fig. 1.

The apparatus illustrated is adapted to function to control the operations of the recording device whenever the photoelectric cells and light beams coincide after the triggers are pulled. The apparatus may, therefore, be employed merely to indicate the time required by a subject to make the photoelectric cell and light beam coincide, in which event the trigger may be maintained in a "pulled" position, or the apparatus may be employed to indicate the time and shooting accuracy as well. When shooting conditions are to be simulated, the trigger should be pulled only when the subject believes that the light beam and the photoelectric cell coincide.

If, in the use of the apparatus illustrated for testing shooting accuracy, the trigger is pulled without the photoelectric cell and the light beam properly coinciding, the recording apparatus will show a continuation of the elapsed time, indicating a "miss". A "miss" by a subject will be apparent to the subject and the operator of the apparatus when the apparatus continues to record elapsed time after the trigger has been pulled. In order that the operator may become aware of the pulling of the trigger in the event of a miss, the gun may be provided with explosive caps or other suitable sound making agencies which may be fired or caused to operate through movement of the trigger.

I claim:—

1. Apparatus of the character described comprising a light source, a light sensitive cell under control of an operator to be tested, a time indicating device, an electric circuit, said circuit including said light sensitive cell and also including means for controlling the operation of the time indicating device to mark the end of the indicating period, said means being operable when light rays from said light source are directed on said light sensitive cell.

2. Apparatus of the character described comprising a screen, a rotating source of light arranged to cast a moving light spot on said screen, a light sensitive cell under control of an operator to be tested, a time indicating device, an electric circuit, said circuit including said light sensitive cell and also including means for controlling the operation of the indicating device to mark the end of the time indicating period, said means being operable when light rays from said light source are directed on said light sensitive cell.

3. Apparatus of the character described comprising a gun, a light sensitive cell carried thereby, a light source, a time indicating device, an electric circuit, said circuit including said light sensitive cell and also including means for controlling the operation of the time indicating device to mark the end of the indicating period, said means being operable when light rays from said light source are directed on said light sensitive cell.

4. Apparatus of the character described comprising a gun, a light sensitive cell carried thereby, a rotating source of light, a time indicating device, an electric circuit, said circuit including said light sensitive cell and also including means for controlling the operation of the time indicating device to mark the end of the indicating period, said means being operable when light rays from said light source are directed on said light sensitive cell.

5. Apparatus of the character described comprising a gun, a light sensitive cell carried thereby, a light source, a time indicating device, an electric circuit, said circuit including said light sensitive cell and also including means for stopping said time indicating device, and a switch mounted on said gun whereby rays of light from said light source must be projected on said cell and said switch actuated to close said circuit and stop said time indicating device.

GEORGE A. FOISY.